(12) United States Patent
Yang (10) Patent No.: US 6,615,049 B1
(45) Date of Patent: Sep. 2, 2003

(54) METHOD AND APPARATUS FOR SENDING AN AURAL MESSAGE INDICATIVE OF A STATUS OF A FACSIMILE APPARATUS TO A USER OF A CORDLESS HANDSET OF A WIRELESS TELEPHONE SET

(75) Inventor: Kyeong-Taeg Yang, Gumi (KR)

(73) Assignee: SamSung Electronics Co., Ltd., Suwon (KR)

( * ) Notice: Subject to any disclaimer, the term of this patent is extended or adjusted under 35 U.S.C. 154(b) by 1118 days.

(21) Appl. No.: 08/777,721

(22) Filed: Dec. 20, 1996

(30) Foreign Application Priority Data

Dec. 21, 1995 (KR) ........................................ 1995-53538

(51) Int. Cl.⁷ ................................................. H04Q 7/20
(52) U.S. Cl. ...................................................... 455/462
(58) Field of Search .............................. 455/462, 556; 358/400

(56) References Cited

U.S. PATENT DOCUMENTS

| 5,479,485 | A | | 12/1995 | Hayashi ...................... 455/462 |
|---|---|---|---|---|
| 5,481,595 | A | * | 1/1996 | Ohashi et al. ................. 379/67 |
| 5,519,763 | A | | 5/1996 | Namekawa et al. ......... 455/556 |
| 5,568,538 | A | * | 10/1996 | Tamir et al. ................... 379/88 |
| 5,627,877 | A | * | 5/1997 | Penttonen |
| 5,684,260 | A | * | 11/1997 | Van Buskirk ................. 84/604 |

FOREIGN PATENT DOCUMENTS

JP           4-299645        10/1992

OTHER PUBLICATIONS

Japanese Patent Office Action, dated Dec. 12, 2000.

* cited by examiner

*Primary Examiner*—William Cumming
(74) *Attorney, Agent, or Firm*—Robert E. Bushnell, Esq.

(57) ABSTRACT

A wireless telephone set having a cordless handset and a base unit incorporating a facsimile apparatus. The cordless handset comprises a transmission mode key and a reception mode key which may be activated by a user of the cordless handset for controlling the facsimile apparatus in order to transmit or receive facsimile data. A voice mixer is provided which stores a plurality of messages to be read out and processed in order to transmit an aural message to the cordless handset under the control of a control unit in accordance with specific codes indicating the current status of the facsimile apparatus.

20 Claims, 4 Drawing Sheets

Fig. 1

| Code | Data |
|---|---|
| E1 | WRONG KEY INPUT, PRESS AGAIN |
| E2 | NOT READY FOR TRANSMISSION |
| E3 | NOT READY FOR RECEPTION |
| T1 | IN TRANSMITTING MODE |
| T2 | TRANSMISSION COMPLETED |
| T3 | TRANSMISSION FAILED, SEND AGAIN |
| R1 | IN RECEIVING MODE |
| R2 | RECEPTION COMPLETED |
| R3 | RECEPTION FAILED, REQUEST TRANSMISSION AGAIN |

METHOD AND APPARATUS FOR SENDING AN AURAL MESSAGE INDICATIVE OF A STATUS OF A FACSIMILE APPARATUS TO A USER OF A CORDLESS HANDSET OF A WIRELESS TELEPHONE SET

CLAIM OF PRIORITY

This application makes reference to, incorporates the same herein, and claims all benefits accruing under 35 U.S.C §119 from an application entitled Method And Apparatus For Sending An Aural Message Informing Of A Status Of A Facsimile earlier filed in the Korean Industrial Property Office on Dec. 21, 1995, and there duly assigned Ser. No. 53538/1995 by that Office.

BACKGROUND OF THE INVENTION

1. Field of the Invention

The present invention relates to a wireless telephone set utilizing a base unit incorporating a built-in facsimile apparatus and a cordless unit, and more particularly to a method and apparatus for informing a user of the status of the facsimile apparatus by an aural message via the cordless unit during a facsimile receiving mode or a facsimile transmitting mode.

2. Background Art

Wireless telephone sets comprising a base unit and cordless unit are common place, and use of a facsimile apparatus with the wireless telephone sets is also known as evidenced by U.S. Pat. No. 5,479,485 to Motohiko Hayashi entitled Facsimile Apparatus Comprising Cordless Telephone Set which wherein the content of a received call over a telephone line to the base unit controls whether or not the call is directed towards the facsimile apparatus. Additionally, it is known to provide a wireless telephone sets comprising a base unit and a cordless handset with a cordless facsimile apparatus as set forth, for example, in U.S. Pat. No. 5,519,763 entitled Communication Apparatus With Wireless Intercommunication by Takeshi Namekawa, which also suggests that the content of a received call over a telephone line to the base unit control whether or not the call is directed towards the facsimile apparatus.

In a conventional facsimile system, problems, such a paper jamming, no paper, lost communication connection, etc, are known which cause an interruption or incomplete transmission of the facsimile data to a receiving facsimile apparatus. When such a problem arises it is known to provide some indication, such as a print out, that the transmission was not completed, thus informing the sender that it is necessary to retransmit the facsimile data. If the problem exits with the receiving facsimile apparatus, then the retransmission of the facsimile data will not be satisfactorily completed unless an operator of the receiving facsimile has corrected the problem. Similarly, it is known to store facsimile data at the transmitting facsimile apparatus for later unmanned transmission, and if a problem exists at the receiving facsimile apparatus, then the operator of the transmitting facsimile apparatus will be unaware of such a problem until returning to location of the transmitting facsimile apparatus and finding a report indicating that the facsimile transmission was not completed. Additionally, problems, such as paper jamming during scanning and transmission of a document, can occur at the transmission facsimile apparatus. Furthermore, a communication channel is cut off at the moment a problem occurs with the facsimile transmission, thus inconveniencing the user by making the user attempt a retransmission of the facsimile data.

With wireless telephone sets incorporating a facsimile apparatus, transmission of facsimile data by incorporating a transmission key in the cordless handset for remotely controlling a facsimile transmitting mode by detecting, in the base unit, activation of the transmission key, after speaking over the telephone by use of the cordless handset, has been contemplated. Also, when it is desired to receive facsimile data after speaking over the telephone via the cordless handset, use of a reception key incorporated into the cordless handset has been contemplated to permit reception of facsimile data in a receiving mode, by detecting, in the base unit, activation of the reception key. Accordingly, problems similar to those discussed above with respect to known facsimile systems can also occur in the facsimile apparatus associated with a wireless telephone set.

SUMMARY OF THE INVENTION

Therefore, it is an object of the present invention to provide a method and apparatus for controlling a facsimile apparatus from a cordless handset of a wireless telephone set.

Another object to provide a method and apparatus for controlling, from the cordless handset, a transmission mode or a reception mode of the facsimile apparatus.

Yet another object to provide an aural message to a user of the cordless handset when an error occurs when attempting to control one of the transmission or reception modes of the facsimile apparatus.

Still yet another object to provide an aural message to the user of the cordless handset for informing the user of a current operating status of the facsimile apparatus during the transmission and reception modes.

A further object to provide an aural message to the user of the cordless handset for informing the user of an operational error of the facsimile apparatus during the transmission and reception modes.

To achieve these objects and other objects, there is provided a wireless telephone set having a cordless handset and a base unit incorporating a facsimile apparatus. The cordless handset comprises a transmission mode key and a reception mode key which may be activated by a user of the cordless handset for controlling the facsimile apparatus in order to transmit or receive facsimile data. A voice mixer is provided which stores a plurality of messages to be read out and processed in order to transmit an aural message to the cordless handset under the control of a control unit in accordance with specific codes indicating the current status of the facsimile apparatus.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of a method and apparatus for sending an aural message indicative of a status of a facsimile apparatus to a user of a cordless handset of a wireless telephone set according to the present invention will be described in detail below with reference to accompanying drawings.

Figure 1:
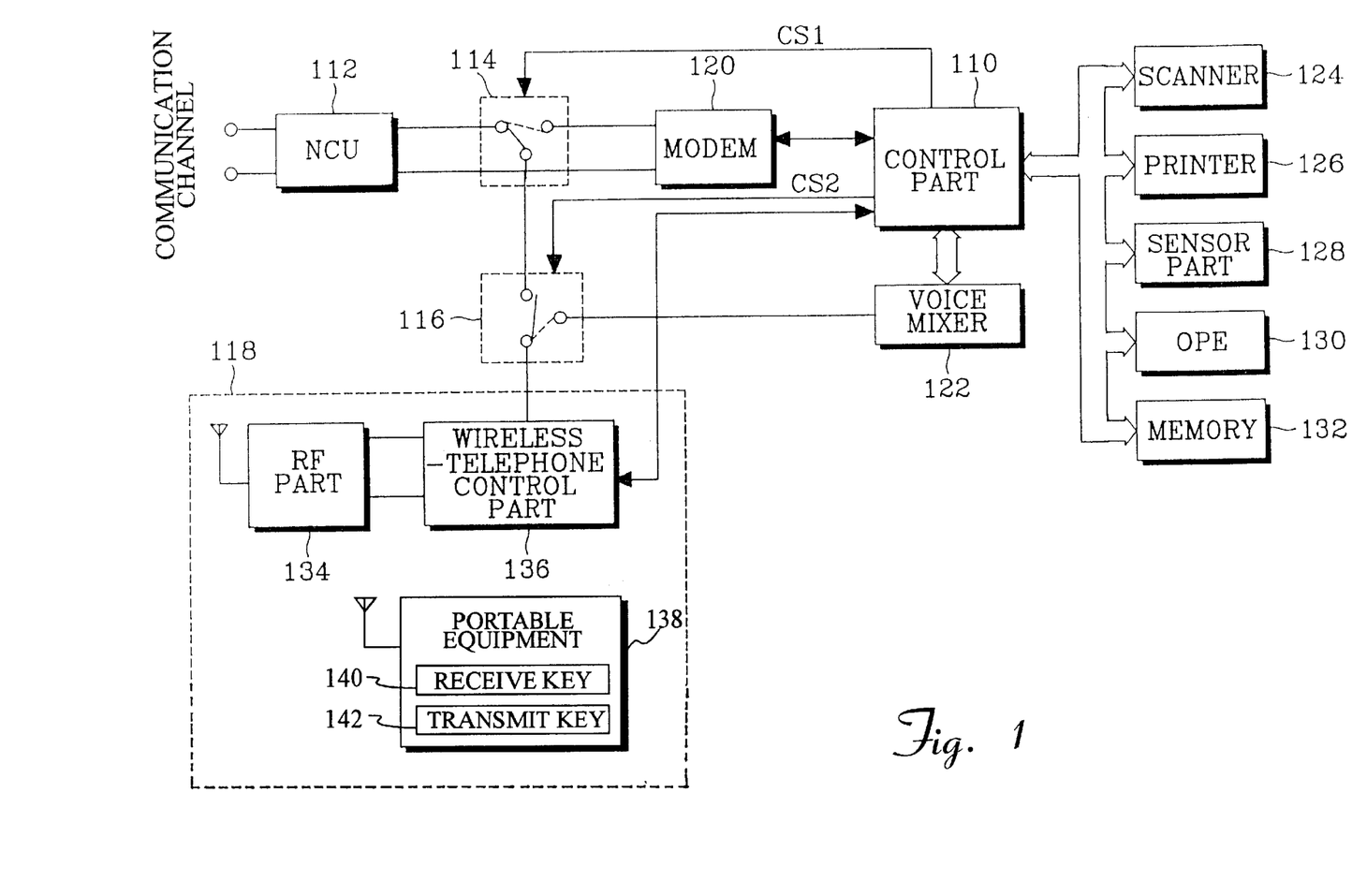
FIG. 1 is a block diagram showing wireless telephone set incorporating a facsimile apparatus according to the principles of the present invention.

FIG. 1 is a block diagram showing wireless telephone set and facsimile apparatus according to the present invention, in which a control part 110 controls overall operation of the facsimile furnished with a wireless telephone in accordance with a preset program. Also, control part 110 performs a control operation for performing a function for informing of the status of the facsimile, according to a facsimile transmitting mode or facsimile receiving mode, via an aural message. A network control unit (NCU) 112 forms an interface connection for controlling communication between a telephone line and facsimile under the control of control part 110. A first switch 114 connects NCU 112 with a wireless telephone 118 or a modem 120 under the control of control part 110. A second switch 116 connects wireless telephone 118 to first switch 114 or a voice mixer 122 under the control of control part 110. Also, wireless telephone 118 includes a portable equipment 138 comprising a cordless handset provided with keys, including a receive key 140 for shifting into the facsimile receiving mode and a transmit key 142 for shifting into the facsimile transmitting mode, capable of shifting the mode of the facsimile, and a base unit including a RF part 134 for transmitting/receiving data with portable equipment 138 by means of radio frequencies, and a wireless-telephone control part 136 for controlling overall operation of wireless telephone 118 under the control of control part 110. Modem 120 is controlled by control part 110 to demodulate an analog signal from NCU 112 into a digital signal, and modulates a digital signal from control part 110 into an analog signal. Voice mixer 122 stores plural aural messages corresponding predetermined status codes, and in accordance with a current status of the facsimile, a selected aural message is read out to supply the selected aural message to wireless telephone 118 under the control of control part 110 according to a detected current status code of the facsimile. The facsimile apparatus is comprised of a scanner 124 for scanning a document to be transmitted or duplicated under the control of control part 110 to convert it into binary information which is in turn supplied to control part 110, a printer 126 for printing the document under reception or desired to be duplicated under the control of control part 110, a sensor part 128 for sensing a current status of the facsimile, such as paper jam or lack of paper to be scanned or printed on, supplying the result status to control part 110, an operating panel (OPE) 130 consisting of a key matrix provided with a plurality of keys for supplying key data generated by key manipulations to control part 110, and a memory 132 for storing the receiving or scanning data when there is no recording paper in the receiving mode or copy mode, and reads out the stored data in accordance with the control of control part 110.

Figure 2:
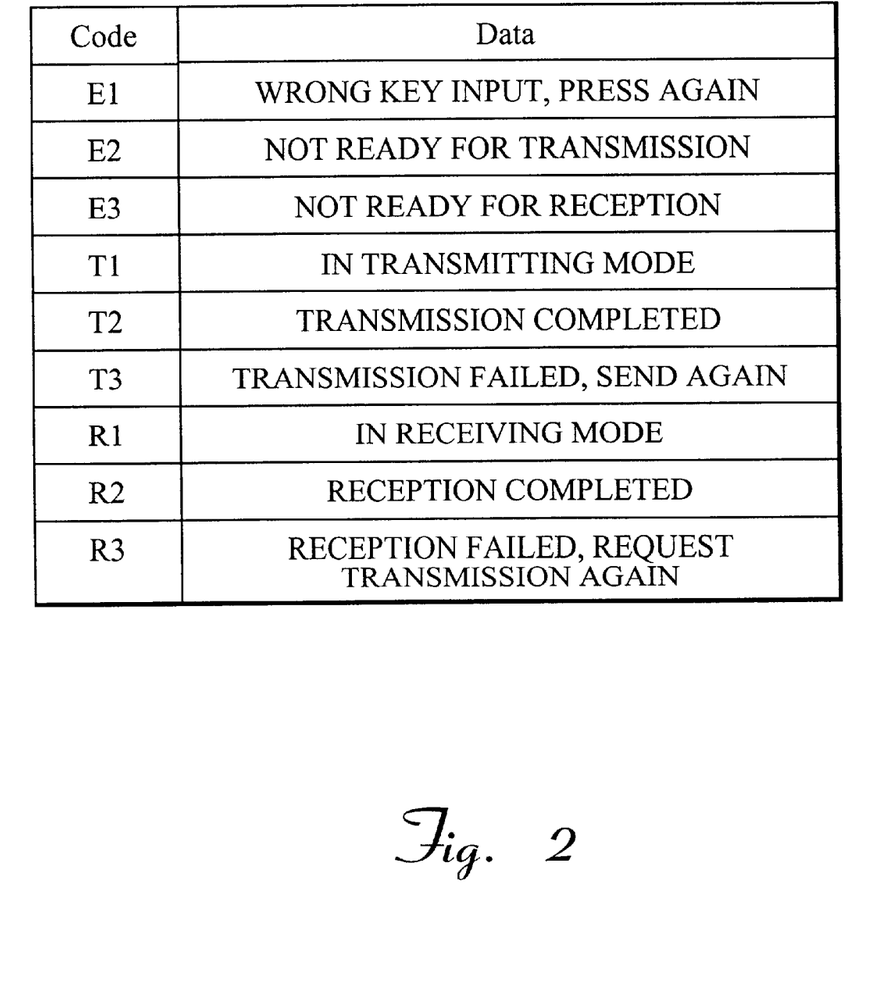
FIG. 2 shows a map structure of stored aural messages corresponding to codes indicative of the status of current modes of operation of the wireless telephone set and facsimile apparatus according to the principles of the present invention.

FIG. 2 shows a map structure of a memory of voice mixer 122 registered with the plural aural messages according to the present invention. Referring to FIG. 2, a status code in accordance with detectable statuses of the facsimile and corresponding aural message is formed as data to be stored. The code consists of codes E1, E2 and E3 resulting from detectable error occurrences, codes T1, T2 and T3 associated with a facsimile transmitting mode, and codes R1, R2 and R3 associated with a facsimile receiving mode.

Figure 3A:
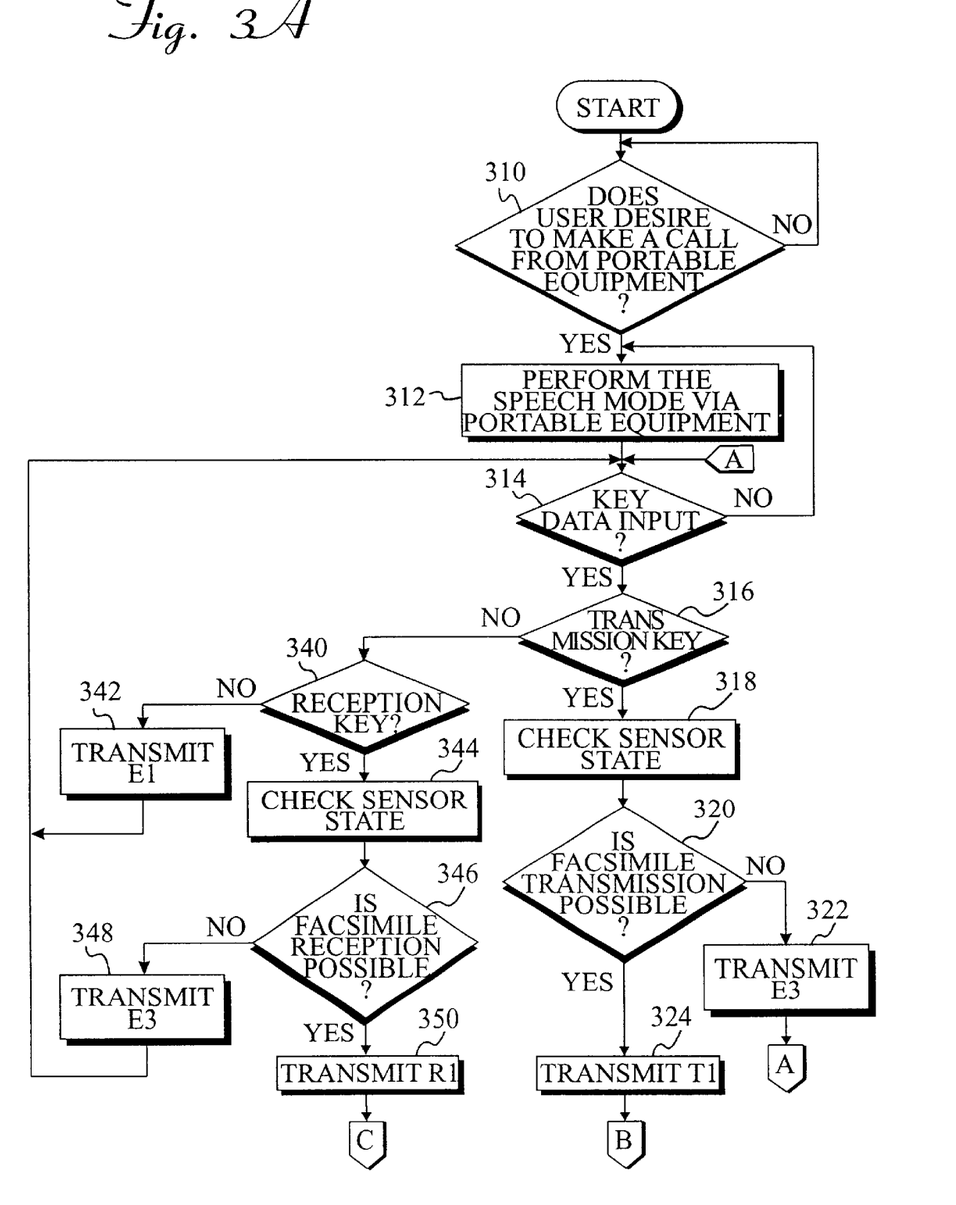
FIGS. 3A and 3B illustrate a flow control chart for determining a current status of the wireless telephone set and facsimile apparatus, and transmitting the aural message corresponding to the current status to the cordless handset according to the principles of present invention.
Figure 3B:
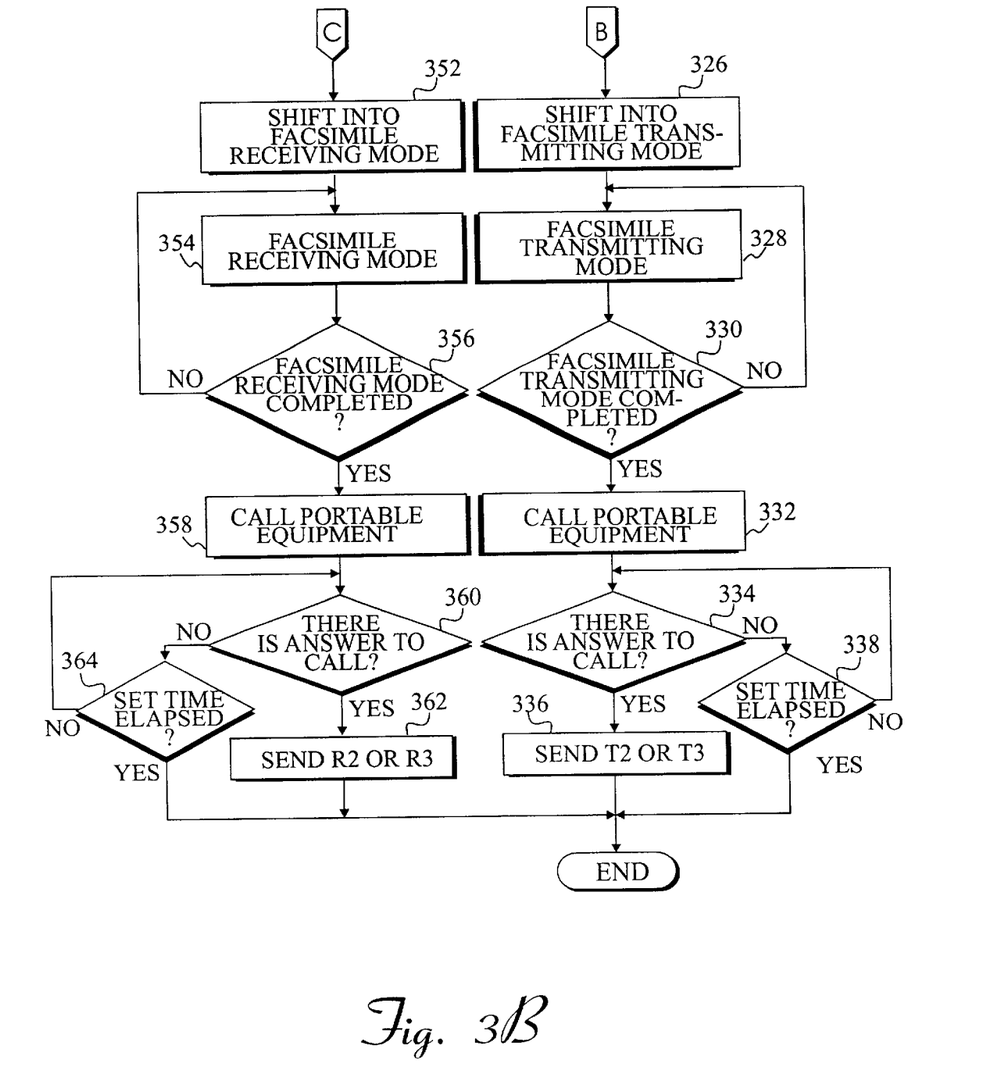

FIGS. 1 and 2 will be further explained below in combination with the detailed explanation of FIGS. 3A and 3B. FIGS. 3A and 3B illustrate a flow control chart for transmitting to portable equipment 138 a selected one of the aural messages corresponding to a detected status of the facsimile. Here, the operation is performed by the steps of sensing whether a transmit key 142 or receive key 140 is received from portable equipment 138 during the portable equipment speech mode, of sending the aural message informing the user that the wrong key was input when a key data other than the key data of the transmit key 142 or receive key 140 is received, of sending the aural message informing the user whether the transmission mode or reception mode is possible upon the input of the transmit key 142 data or receive key 140 data, and of sending the aural message informing the user of the completion or failure of the facsimile transmission mode of facsimile reception mode by calling portable equipment 138 upon the completion of the facsimile transmission mode or facsimile reception mode.

Control part 110 determines whether a user desires to make a call from portable equipment 138 of wireless telephone 118 in step 310. When control part 110 determines that it is desired to make a call from portable equipment 138, first switch 114 receives a control signal CS1 from control part 110 to connect NCU 112 to second switch 116 and second switch 116 receives a control signal CS2 from control part 110 to connected toward first switch 114 to wireless telephone control part 136. Control part 110 controls wireless-telephone control part 136 to perform the speech mode in step 312. During the speech mode, control part 110 senses, in step 314, key data generated by wireless telephone 118 upon user activation of the keys of portable equipment 138. When the key data is sensed in step 314, control part 110 analyzes, in steps 316 and 340, the key data to determine whether the key data was the result of the user activating one of the facsimile transmit or receive keys.

When it is determined that the analyzed key data corresponds to the facsimile transmit key 142 in step 316, control part 110 proceeds to step 318. In step 318, control part 110 controls second switch 116 to switch over toward voice mixer 122, and checks a state of sensor part 128 in step 318. In step 320, control part 110 determines whether the state of sensor 128 indicates that a facsimile can be transmitted. When it is determined in step 320 that a facsimile transmission is not possible, e.g., when there is no document to be scanned, control part 110 addresses the aural message corresponding to code E2 and voice mixer 122 synthesizes the message data for transmission to portable equipment 138 in step 322. After transmitting the aural message corresponding to code E2, ie., "not ready for transmission" as shown in FIG. 2, control part 110 returns to step 314 to sense whether new key data is received or not.

When it is determined in step 320 that a facsimile transmission is possible, control part 110 addresses the aural message corresponding to code T1 and voice mixer 122 synthesizes the message data for transmission to portable equipment 138 in step 324. After transmitting the aural message corresponding to code T1, ie., "in transmitting mode" as shown in FIG. 2, control part 110 shifts the system into a transmitting mode in step 326 by controlling first switch 114 to connect NCU 112 and the facsimile, and controls second switch 116 to maintain the state of connecting wireless telephone 118 to voice mixer 122. Once being shifted into the transmitting mode in step 326, control part 110 carries out the facsimile transmitting mode operation for transmitting the document facsimile to the receiving part in step 328. The operation of the facsimile transmitting mode is well-known in the art, of which detailed description will thus be omitted.

Control part 110 then senses the state of sensor part 128 to determine whether the facsimile transmission is completed or not via sensor part 128 in step 330. A completed facsimile transmitting mode is an indication that the transmitting mode has ended and the reason therefore, e.g., a complete transmission of data, a paper jam, or a lost connection will end the transmitting mode. Upon sensing a completed facsimile transmitting mode, control part 110 controls wireless telephone control part 136 of wireless telephone 118 in step 332 to call portable equipment 138. Control part 110 senses whether portable equipment 138 supplies an answer or not during a set time period in steps 334 and 338. If there is no answer to the call during the set time period, the call is terminated. When an answer to the call is sensed in step 334, control part 110 provides an aural message, step 336, corresponding to code T2 or T3 to the base unit, i.e., control part 136 and RF part 134, for transmission to the cordless handset, i.e., portable equipment 136. The aural message corresponding to code T2, i.e., "transmission completed" as shown in FIG. 2, is transmitted when the facsimile is successfully transmitted. The aural message corresponding to code T3, i.e., "transmission failed, send again" as shown in FIG. 2, is transmitted when a problem occurs, e.g., no document to be fed to scanner 124, paper jam during scanning or telephone line connection lost, which stops the facsimile from being successfully transmitted. Following steps 338 or 336, control part 110 returns switches 114 and 116 to their normal positions of connecting wireless telephone set 118 to NCU 112.

When it is determined that the analyzed key data corresponds to the facsimile receive key 140 in step 340, control part 110 proceeds to step 344. In step 344, control part 110 controls second switch 116 to switch over toward voice mixer 122, and checks a state of sensor part 128 in step 344. In step 346, control part 110 determines whether the state of sensor 128 indicates that a facsimile can be received. When it is determined in step 346 that a facsimile reception is not possible, e.g., when there is no paper to be printed on, the facsimile apparatus is in a jammed state, or the facsimile apparatus is in an off state, control part 110 addresses the aural message corresponding to code E3 and voice mixer 122 synthesizes the message data for transmission to portable equipment 138 in step 348. After transmitting the aural message corresponding to code E3, i.e., "not ready for reception" as shown in FIG. 2, control part 110 returns to step 314 to sense whether new key data is received or not.

When it is determined in step 346 that a facsimile reception is possible, control part 110 addresses the aural message corresponding to code R1 and voice mixer 122 synthesizes the message data for reception to portable equipment 138 in step 350. After transmitting the aural message corresponding to code R1, i.e., "in receiving mode" as shown in FIG. 2, control part 110 shifts the system into a receiving mode in step 352 by controlling first switch 114 to connect NCU 112 and the facsimile, and controls second switch 116 to maintain the state of connecting wireless telephone 118 to voice mixer 122. Once being shifted into the receiving mode in step 352, control part 110 carries out the facsimile receiving mode operation for receiving the document facsimile to the receiving part in step 354. The operation of the facsimile receiving mode is well-known in the art, of which detailed description will thus be omitted.

Control part 110 then senses the state of sensor part 128 to determine whether the facsimile receiving mode is completed or not in step 356. A completed facsimile receiving mode is an indication that the receiving mode has ended and the reason therefore, e.g., a complete reception of data, a paper jam, or a lost connection will end the reception mode. Upon sensing a completed facsimile receiving mode, control part 110 controls wireless telephone control part 136 of wireless telephone 118 in step 358 to call portable equipment 138. Control part 110 senses whether portable equipment 138 supplies an answer or not during a set time period in steps 360 and 364. If there is no answer to the call during the set time period, the call is terminated. When an answer to the call is sensed in step 360, control part 110 provides an aural message, step 362, corresponding to code R2 or R3 to the base unit, i.e., control part 136 and RF part 134, for transmission to the cordless handset, i.e., portable equipment 136. The aural message corresponding to code R2, i.e., "reception completed" as shown in FIG. 2, is received when the facsimile is successfully received. The aural message corresponding to code R3, i.e., "reception failed, request transmission again" as shown in FIG. 2, is transmitted when a problem occurs, e.g., no more paper to be printed on in printer 126, a paper jam during scanning or a lost telephone line connection, which stops the facsimile from being successfully received. Following steps 362 or 364, control part 110 returns switches 114 and 116 to their normal positions of connecting wireless telephone set 118 to NCU 112.

When it is determined that the analyzed key data does not correspond to the facsimile receive key 140 in step 340, control part 110 proceeds to step 344. In step 344, control part 110 controls second switch 116 to switch over toward voice mixer 122, and transmits the aural message corresponding to code E1, i.e., "wrong key input, press again" as shown in FIG. 2, to portable equipment 138, and then proceeds to step 314 to sense whether new key data is received or not.

As described above, when the user of the cordless handset, during the speech mode, desires to transmit or receive a facsimile, the facsimile apparatus is controlled by way of the facsimile transmit or receive keys on portable equipment 138 of the wireless telephone 118, sensor part 128 is checked to determine whether the facsimile apparatus is ready for transmitting or receiving and the user is advised of such readiness via an aural message provided through portable equipment 138, so that the user can quickly ascertain the state of the facsimile apparatus to avoid any problems with starting the facsimile transmitting or receiving modes.

Also, after being shifted into one of the facsimile transmitting or receiving modes, the user is informed, by way of an aural message, of the operational mode of the facsimile apparatus and whether the facsimile transmitting or receiving mode was completed satisfactorily or not due to some problem occurring during the selected mode.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for sending an aural message to a user of a cordless handset of a wireless telephone set having and a base unit incorporating a facsimile apparatus, said method comprising the steps of:

determining an operational state of said facsimile apparatus; and transmitting an aural message, stored in a voice mixer and corresponding to the operational state of said facsimile apparatus, to said cordless handset.

2. The method as set forth in claim 1, said step of determining an operational state of said facsimile apparatus comprising the steps of:

detecting, during a speech mode of said cordless handset, input of key data from said cordless handset;

determining whether said key data corresponds to one of a facsimile transmit key or a facsimile receive key;

transmitting a first aural message to said cordless handset when it is determined that said key data corresponds to neither said facsimile transmit key nor said facsimile receive key;

checking a state of a sensor in said facsimile apparatus to determine whether facsimile transmission is possible when it is determined that said key data corresponds to said facsimile transmit key; and checking a state of said sensor in said facsimile apparatus to determine whether facsimile reception is possible when it is determined that said key data corresponds to said facsimile receive key.

3. The method as set forth in claim 2, said step of transmitting an aural message corresponding to the operational state of said facsimile apparatus to said cordless handset comprising the steps of:

transmitting a first error message to said cordless handset when said step of checking a state of a sensor in said facsimile apparatus to determine whether facsimile transmission is possible determines that said facsimile apparatus is not ready to transmit a facsimile;

transmitting a transmission ready message to said cordless handset when said step of checking a state of a sensor in said facsimile apparatus to determine whether facsimile transmission is possible determines that said facsimile apparatus is ready to transmit a facsimile;

transmitting a second error message to said cordless handset when said step of checking a state of a sensor in said facsimile apparatus to determine whether facsimile reception is possible determines that said facsimile apparatus is not ready to receive a facsimile; and transmitting a reception ready message to said cordless handset when said step of checking a state of a sensor in said facsimile apparatus to determine whether facsimile reception is possible determines that said facsimile apparatus is ready to receive a facsimile.

4. The method as set forth in claim 3, further comprising the steps of:

shifting said facsimile apparatus into a facsimile transmitting mode after performing said step of transmitting a transmission ready message to said cordless handset;

determining when said facsimile transmitting mode ends;

transmitting a transmission completed message to said cordless handset indicating a complete transmission of facsimile data during said facsimile transmitting mode; and transmitting a transmission failed message indicating transmission of facsimile data was interrupted during said facsimile transmitting mode.

5. The method as set forth in claim 3, further comprising the steps of:

shifting said facsimile apparatus into a facsimile receiving mode after performing said step of transmitting a reception ready message to said cordless handset;

determining when said facsimile receiving mode ends;

transmitting a reception completed message to said cordless handset indicating a complete reception of facsimile data during said facsimile receiving mode; and transmitting a reception failed message indicating reception of facsimile data was interrupted during said facsimile receiving mode.

6. An apparatus for sending an aural message indicative of a status of a facsimile apparatus to a user of a cordless handset of a wireless telephone set, said apparatus comprising:

a network control unit forming an interface for controlling communication between a telephone line and said facsimile apparatus;

a first switch selectively connecting one of said facsimile apparatus and said wireless telephone set to said network control unit;

a voice mixer storing a plurality of messages corresponding to predetermined status codes of said facsimile apparatus;

a second switch for selectively connecting one of said first switch and said voice mixer to said wireless telephone set;

control means responsive to user activation of one of a facsimile transmit key and a facsimile receive key on said cordless handset for controlling switching of said second switch to connect said wireless telephone set to said voice mixer;

sensor means providing status codes of said facsimile apparatus;

said control means detecting a current status code of said facsimile apparatus by checking said sensor means; and said control means controlling said voice mixer to transmit one of said plurality of stored messages corresponding to said current status code to said cordless handset via a base unit of said wireless telephone set.

7. The apparatus as set forth in claim 6, further comprising:

a modem connected between said first switch and said control means, said first switch being controlled by said control means to connect said network control unit to said modem during a facsimile transmission mode and a facsimile reception mode; and said modem being controlled by said control means to demodulate an analog signal received from said network control unit into a digital signal and for modulating a digital signal received from said facsimile apparatus into an analog signal.

8. The apparatus as set forth in claim 6, further comprising:

said control means detecting when a user of said cordless handset desires to make a telephone call and controlling said first and second switches to connect said wireless telephone set to said network control unit to operate said apparatus in a speech mode.

9. The apparatus as set forth in claim 8, further comprising:

said control means detecting, during said speech mode, input of key data from said cordless handset to determine whether said key data corresponds to one of said facsimile transmit key and said facsimile receive key;

said control means controlling said voice mixer for transmitting a first aural message to said cordless handset when it is determined that said key data corresponds to neither said facsimile transmit key nor said facsimile receive key;

said control means checking a state of said sensor means to determine whether facsimile transmission is possible when it is determined that said key data corresponds to said facsimile transmit key; and said control means checking a state of said sensor means to determine whether facsimile reception is possible when it is determined that said key data corresponds to said facsimile receive key.

10. The apparatus as set forth in claim 9, further comprising:

said control means controlling said voice mixer to transmit an error message to said cordless handset when it is determined that a current state of said sensor means indicates that said facsimile transmission is not possible; and said control means controlling said voice mixer to transmit a transmission ready message to said cordless handset when it is determined that a current state of said sensor means indicates that said facsimile transmission is possible.

11. The apparatus as set forth in claim 9, further comprising:

said control means controlling said voice mixer to transmit an error message to said cordless handset when it is determined that a current state of said sensor means indicates that said facsimile reception is not possible; and said control means controlling said voice mixer to transmit a transmission ready message to said cordless handset when it is determined that a current state of said sensor means indicates that said facsimile reception is possible.

12. The apparatus as set forth in claim 10, further comprising said control means controlling said first switch to connect said network control unit to said facsimile apparatus and controlling said facsimile apparatus to shift said facsimile apparatus into a facsimile transmitting mode after transmission of said transmission ready message;

said control means detecting a current state of said sensor means when said facsimile transmission mode ends to determine whether facsimile data was completely transmitted or whether transmission of said facsimile data failed;

said control means controlling said voice mixer to transmit a transmission completed message to said cordless handset when it determines said facsimile data was completely transmitted; and said control means controlling said voice mixer to transmit a transmission failed message to said cordless handset when it determines that transmission of said facsimile data failed.

13. The apparatus as set forth in claim 11, further comprising:

said control means controlling said first switch to connect said network control unit to said facsimile apparatus and controlling said facsimile apparatus to shift said facsimile apparatus into a facsimile receiving mode after transmission of said reception ready message;

said control means detecting a current state of said sensor means when said facsimile reception mode ends to determine whether facsimile data was completely received or whether reception of said facsimile data failed;

said control means controlling said voice mixer to transmit a reception completed message to said cordless handset when it determines said facsimile data was completely received; and said control means controlling said voice mixer to transmit a reception failed message to said cordless handset when it determines that reception of said facsimile data failed.

14. A method for sending an aural message to a user of a cordless handset of a wireless telephone set having and a base unit incorporating a facsimile apparatus, said method comprising the steps of:

detecting when said user attempts to make a call from said cordless handset;

placing said wireless telephone set into a speech mode of operation by connecting said wireless telephone set to a telephone line after detecting when said user attempts to make a call from said cordless handset;

detecting, during said speech mode, input of key data from said cordless handset;

determining whether said key data corresponds to one of a facsimile transmit key or a facsimile receive key;

transmitting a first aural message to said cordless handset when it is determined that said key data corresponds to neither said facsimile transmit key nor said facsimile receive key;

checking a current state of a sensor in said facsimile apparatus to determine whether facsimile transmission is possible when it is determined that said key data corresponds to said facsimile transmit key; and checking a current state of said sensor in said facsimile apparatus to determine whether facsimile reception is possible when it is determined that said key data corresponds to said facsimile receive key.

15. The method as set forth in claim 14, further comprising the steps of:

transmitting an error message to said cordless handset when it is determined that said facsimile apparatus is not ready to transmit a facsimile; and transmitting a transmission ready message to said cordless handset when it is determined that said facsimile apparatus is ready to transmit a facsimile.

16. The method as set forth in claim 14, further comprising the steps of:

transmitting an error message to said cordless handset when it is determined that said facsimile apparatus is not ready to receive a facsimile; and transmitting a reception ready message to said cordless handset when it is determined that said facsimile apparatus is ready to receive a facsimile.

17. The method as set forth in claim 15, further comprising the steps of:

shifting said facsimile apparatus into a facsimile transmitting mode by connecting said facsimile apparatus to said telephone line after performing said step of transmitting a transmission ready message to said cordless handset;

detecting when said facsimile transmitting mode ends;

detecting, after said transmitting mode ends, a current state of said sensor to determine whether facsimile data was completely transmitted or whether transmission of said facsimile data failed;

transmitting a transmission completed message to said cordless handset when said current state of said sensor indicates that said facsimile data was completely transmitted; and transmitting a transmission failed message to said cordless handset when said current state of said sensor indicates that transmission of said facsimile data failed.

18. The method as set forth in claim 16, further comprising the steps of:

shifting said facsimile apparatus into a facsimile receiving mode by connecting said facsimile apparatus to said telephone line after performing said step of transmitting a reception ready message to said cordless handset;

detecting when said facsimile receiving mode ends;

detecting, after said receiving mode ends, a current state of said sensor to determine whether facsimile data was completely received or whether reception of said facsimile data failed;

transmitting a reception completed message to said cordless handset when said current state of said sensor indicates that said facsimile data was completely received; and transmitting a reception failed message to said cordless handset when said current state of said sensor indicates that reception of said facsimile data failed.

19. The method as set forth in claim 17, further comprising the steps of:

calling said cordless handset after detecting when said transmitting mode ends;

determining whether there is an answer to said calling step within a predetermined time period;

transmitting said aural message to said cordless handset when said calling step is answered within said predetermined time period; and connecting said wireless telephone set to said telephone line when said calling is not answered within said predetermined time period.

20. The method as set forth in claim 18, further comprising the steps of:

calling said cordless handset after detecting when said receiving mode ends;

determining whether there is an answer to said calling step within a predetermined time period;

transmitting said aural message to said cordless handset when said calling step is answered within said predetermined time period; and connecting said wireless telephone set to said telephone line when said calling step is not answered within said predetermined time period.

\* \* \* \* \*